United States Patent
Sun et al.

(10) Patent No.: US 10,591,890 B2
(45) Date of Patent: Mar. 17, 2020

(54) LOCALIZATION DEVICE USING MAGNETIC FIELD AND POSITIONING METHOD THEREOF

(71) Applicant: INDUSTRIAL TECHNOLOGY RESEARCH INSTITUTE, Hsinchu (TW)

(72) Inventors: Kuan-Chun Sun, Linnei Township (TW); Sheng-Wen Lo, Kaohsiung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 220 days.

(21) Appl. No.: 15/379,169

(22) Filed: Dec. 14, 2016

(65) Prior Publication Data
US 2018/0011472 A1    Jan. 11, 2018

Related U.S. Application Data

(60) Provisional application No. 62/358,582, filed on Jul. 6, 2016.

(30) Foreign Application Priority Data

Sep. 5, 2016  (TW) .............................. 105128638 A

(51) Int. Cl.
  *G05B 19/402* (2006.01)
  *G05D 1/02* (2020.01)
  *G01C 21/00* (2006.01)

(52) U.S. Cl.
  CPC ........... *G05B 19/402* (2013.01); *G01C 21/00* (2013.01); *G05D 1/0261* (2013.01); *G05B 2219/41332* (2013.01); *G05D 2201/0216* (2013.01)

(58) Field of Classification Search
  CPC .................................................. G05D 1/0261
  See application file for complete search history.

(56) References Cited

U.S. PATENT DOCUMENTS

| 6,269,291 B1 | 7/2001 | Segeren |
| 6,690,963 B2 | 2/2004 | Ben-Haim et al. |

(Continued)

FOREIGN PATENT DOCUMENTS

| CN | 102147259 A | 8/2011 |
| CN | 102686979 B | 2/2015 |

(Continued)

OTHER PUBLICATIONS

Taiwanese Office Action and Search Report, dated Jun. 27, 2017, for Taiwanese Application No. 105128638.

(Continued)

*Primary Examiner* — Yu-Hsi D Sun
(74) *Attorney, Agent, or Firm* — Birch, Stewart, Kolasch & Birch, LLP

(57) ABSTRACT

A localization device using a magnetic field for positioning a moving object is provided. The localization device includes a magnetic landmark, a set of at least four tri-axes magnetic sensors mounted on the moving object, and a logic operation processing unit. The set of at least four tri-axes magnetic sensors forms four non-coplanar points in a three-dimension coordinate system. The logic operation processing unit is connected to the set of at least four tri-axes magnetic sensors. The set of at least four tri-axes magnetic sensors senses the magnetic field of the magnetic landmark and generates at least four magnetic signals transmitted to the logic operation processing unit.

9 Claims, 3 Drawing Sheets

(56) References Cited

U.S. PATENT DOCUMENTS

| | | | |
|---|---|---|---|
| 6,762,600 B2 | 7/2004 | Khalfin | |
| 6,841,994 B1 | 1/2005 | Wiegert | |
| 6,888,353 B1* | 5/2005 | Wiegert | G01V 3/15 324/244 |
| 7,038,458 B1* | 5/2006 | Wiegert | G01V 3/081 324/244 |
| 7,292,948 B2 | 11/2007 | Jones, Jr. et al. | |
| 7,835,785 B2 | 11/2010 | Scully et al. | |
| 7,912,633 B1 | 3/2011 | Dietsch et al. | |
| 8,220,710 B2 | 7/2012 | Hoffman et al. | |
| 8,928,602 B1 | 1/2015 | Wan | |
| 9,348,009 B2 | 5/2016 | Sontag | |
| 9,459,124 B2 | 10/2016 | Khalfin et al. | |
| 2006/0038555 A1 | 2/2006 | Higgins et al. | |
| 2009/0128139 A1 | 5/2009 | Drenth et al. | |
| 2010/0127696 A1 | 5/2010 | Huber et al. | |
| 2015/0061648 A1 | 3/2015 | Park et al. | |
| 2016/0147231 A1 | 5/2016 | Sun et al. | |

FOREIGN PATENT DOCUMENTS

| | | |
|---|---|---|
| CN | 103268116 B | 2/2015 |
| CN | 105044630 A | 11/2015 |
| CN | 204871280 U | 12/2015 |
| EP | 2863284 A2 | 4/2015 |
| JP | 11-304405 A | 11/1999 |
| TW | 200934710 A | 8/2009 |
| TW | M465591 U | 11/2013 |
| TW | 201407308 A | 2/2014 |
| TW | I431247 B | 3/2014 |
| TW | 201447525 A | 12/2014 |
| TW | I470386 B | 1/2015 |
| TW | 201619038 A | 6/2016 |

OTHER PUBLICATIONS

Hu et al., "A Novel Positioning and Orientation System Based on Three-Axis Magnetic Coils," IEEE Transactions on Magnetics, vol. 48, No. 7, Jul. 2012, pp. 2211-2219.

Taiwanese Office Action and Search Report, dated Jun. 28, 2018, for Taiwanese Application No. 106131453.

Chung et al., "Indoor Location Sensing Using Geo-Magnetism", pp. 141-154.

Hou et al., "Experimental Study of Magnetic-based Localization Model for Miniature Medical Device Placed Indwelling Human Body", Proceedings of the 2005 IEEE, Engineering in Medicine and Biology 27th Annual Conference, Shanghai, China, Sep. 1-4, 2005, pp. 1309-1312.

Hu et al., "A Robust Orientation Estimation Algorithm Using MARG Sensors", IEEE Transactions on Instrumentation and Measurement, vol. 64, No. 3, Mar. 2015, pp. 815-822.

Nara et al., "A Closed-Form Formula for Magnetic Dipole Localization by Measurement of Its Magnetic Field and Spatial Gradients", IEEE Transactions on Magnetics, vol. 42, No. 10, Oct. 2006, pp. 3291-3293.

Pang et al., "Integrated Compensation of Magnetometer Array Magnetic Distortion Field and Improvement of Magnetic Object Localization", IEEE Transactions on Geoscience and Remote Sensing, vol. 52, No. 9, Sep. 2014, pp. 5670-5676.

Skog et al., "Pedestrian tracking using an IMU array", pp. 1-4.

Sun et al., "A Single Dipole-based Localization Method in Near Magnetic Field using IMU Array", 2016 IEEE International Workshop on Advanced Robotics and its Social Impacts (ARSO), Shanghai, China, Jul. 8-10, 2016, pp. 152-157.

You et al., "Localization Using Magnetic Patterns for Autonomous Mobile Robot", International Journal of Advanced Robotic Systems, 2014, pp. 1-10.

Marins et al., "An Extended Kalman Filter for Quaternion-Based Orientation Estimation Using MARG Sensors," Proceedings of the 2001 IEEE/RSJ, International Conference on Intelligent Robots and Systems, Maui, Hawaii, Oct. 29-Nov. 3, 2001, pp. 2003-2011 (9 pages total).

U.S. Office Action for U.S. Appl. No. 15/828,012, dated Nov. 5, 2019.

* cited by examiner

LOCALIZATION DEVICE USING MAGNETIC FIELD AND POSITIONING METHOD THEREOF

This application claims the benefits of U.S. provisional application Ser. No. 62/358,582, filed Jul. 6, 2016 and Taiwan application Serial No. 105128638, filed Sep. 5, 2016, the subject matters of which are incorporated herein by reference.

TECHNICAL FIELD

The disclosure relates in general to a localization device, and more particularly to a localization device using magnetic field and a positioning method thereof.

BACKGROUND

Automated guided vehicle (AGV) is an important carrier in the technology field of automated materials handling. In comparison to the transport system using conveyor, the transport system using AGV does not occupy space and allows the production line to be flexibly adjusted. In terms of trackless AGV, most of existing technologies achieve positioning effect using laser reflective labels, magnetic columns or two-dimensional bar code labels. However, when it comes to practical application of the above label positioning technologies, the plant site needs to be emptied in advance, which is difficult to those plants lacking advance planning. Moreover, the above label positioning technologies are limited to two dimensional scenarios and therefore cannot be used in three dimensional scenarios. The above label positioning technologies need to be improved.

SUMMARY

The disclosure is directed to a localization device using magnetic field and a positioning method thereof. According to the localization device and the positioning method of the disclosure, the landmark is formed of a magnetism generation element, and a set of tri-axes magnetic sensors is mounted on a moving object, such that the moving object can be positioned in a three-dimensional space.

According to a first aspect of the present disclosure, a localization device using a magnetic field for positioning a moving object is provided. The localization device includes a magnetic landmark, a set of at least four tri-axes magnetic sensors mounted on the moving object, and a logic operation processing unit. The set of at least four tri-axes magnetic sensors forms four non-coplanar points in a three-dimension coordinate system. The logic operation processing unit is connected to the set of at least four tri-axes magnetic sensors. The set of at least four tri-axes magnetic sensors senses the magnetic field of the magnetic landmark and generates at least four magnetic signals transmitted to the logic operation processing unit.

According to a second aspect of the present disclosure, a positioning method using a magnetic field for positioning a moving object relative to a magnetic landmark is provided. The moving object has a set of at least four tri-axes magnetic sensors mounted thereon. The set of at least four tri-axes magnetic sensors forms four non-coplanar points in a three-dimension coordinate system. The positioning method includes: sensing the magnetic field of the magnetic landmark and generating at least four magnetic signals by the set of at least four tri-axes magnetic sensors.

The above and other aspects of the disclosure will become better understood with regard to the following detailed description of several embodiment(s). The following description is made with reference to the accompanying drawings.

DETAILED DESCRIPTION OF THE DISCLOSURE

Detailed descriptions of the disclosure are disclosed in a number of embodiments. However, the embodiments are for explanatory and exemplary purposes only, not for limiting the scope of protection of the disclosure.

Figure 1:
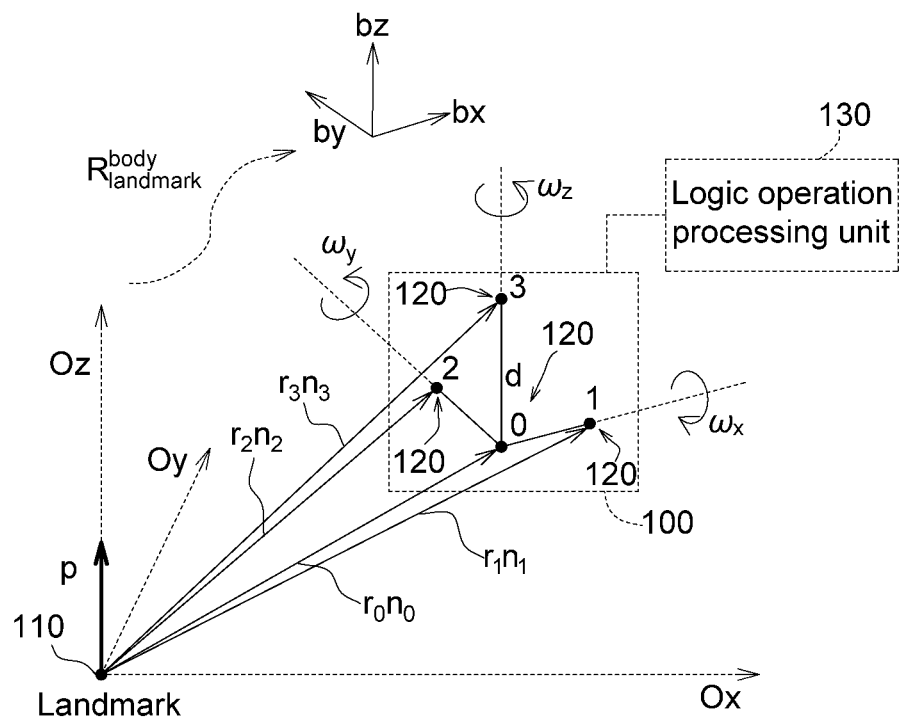
FIG. 1 is a schematic diagram of a localization device using magnetic field according to an embodiment of the disclosure.

Refer to FIG. 1. The localization device according to an embodiment of the disclosure is used for positioning a moving object 100, such as an automatic guided vehicle (AGV). The localization device includes a magnetic landmark 110, a set of at least four tri-axes magnetic sensors 120, and a logic operation processing unit 130. The magnetic landmark 110 is positioned at a positioning point of a workstation for the moving object 100. The set of four tri-axes magnetic sensors 120 is mounted on the moving object 100. When the moving object 100 reaches a workstation, a magnetic landmark 110 is disposed on the ground of the workstation, and at least four tri-axes magnetic sensors 120 are mounted on the moving object 100 to sense a magnetic field of the magnetic landmark 110.

Figure 3:
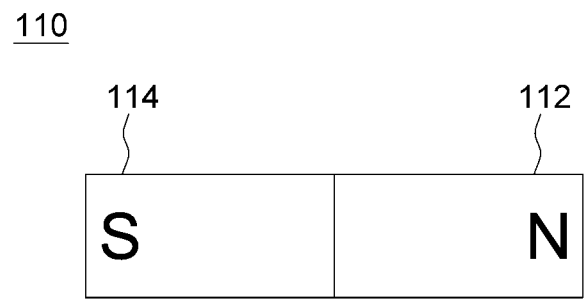
FIG. 3 is a schematic diagram of a magnetic landmark.

The magnetic landmark 110 is for generating a predetermined magnetic field. The magnetic landmark 110 can be a magnet or an electromagnet. Refer to FIG. 3. The magnetic landmark 110 can have an N-pole magnetic source 112 and an S-pole magnetic source 114 or can have multiple N-pole magnetic sources and multiple S-pole magnetic sources. The magnetic intensity of the magnetic landmark 110 is determined according to the quantity of magnetic sources.

Figure 2:
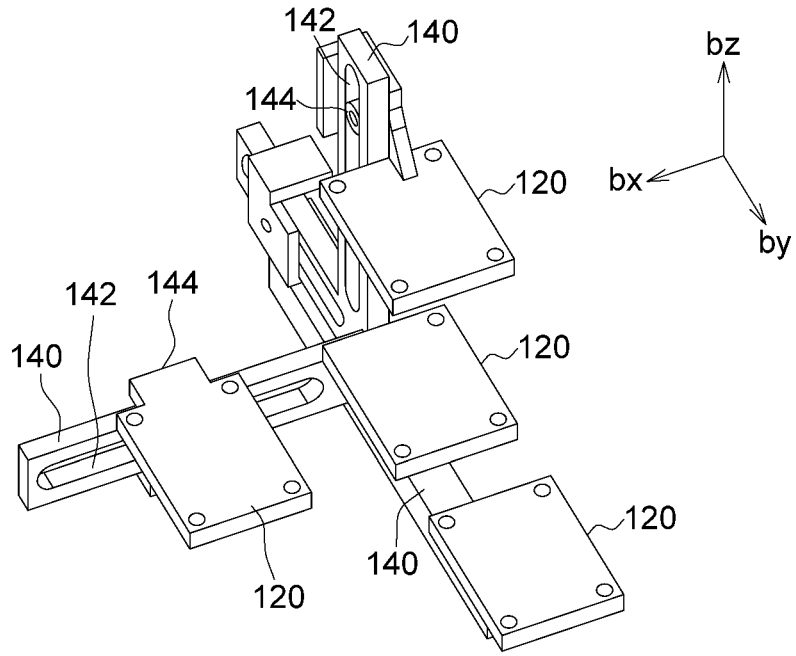
FIG. 2 is a schematic diagram of tri-axes magnetic sensors.

Refer to FIGS. 1 and 2. The four tri-axes magnetic sensors 120 form four non-coplanar points (No. 0~3) in a three-dimension coordinate system. The four tri-axes magnetic sensors 120 correspondingly generate four magnetic signals transmitted to the logic operation processing unit 130. The logic operation processing unit 130 can be a computer or a micro-processor of a computer. Before receiving the magnetic field information, the logic operation processing unit 130 can reduce the noise contained in the magnetic field information to increase the signal-to-noise ratio using a low-pass filter. Then, the magnetic field information can be converted into digitalized magnetic field information by an analog/digital converter. As indicated in FIG. 2, the four tri-axes magnetic sensors 120 are respectively mounted on three orthogonal support frames 140 and relative positions between the four tri-axes magnetic sensors 120 can be adjusted through the sliding chute 142 and the slider 144 mounted on each axis (that is, the slider 144 is positioned on the sliding chute 142 and can be locked at a predetermined position). Therefore, the distance between any two tri-axes magnetic sensors 120 can be increased or decreased.

In an embodiment, tri-axes magnetic sensors 120 can be a three-dimensional electronic compass composed of a three-dimensional magneto-resistive sensor (or magnetometer), a biaxial inclination sensor and a micro-processor. The three-dimensional magneto-resistive sensor is for measuring an external magnetic field. The inclination sensor performs compensation when the magnetometer is in a non-horizontal state. The micro-processor is for processing the signals and data output of the magnetometer and the inclination sensor and the hard/soft iron compensation. The magnetometer is formed of three orthogonal magneto-resistive sensors. The magneto-resistive sensor mounted on each axis detects the magnetic intensity on the same axis. The magneto-resistive sensor in the X direction (forward direction) detects the vector value of the external magnetic field in the X direction. The magneto-resistive sensor in the Y direction (left direction) detects the vector value of the external magnetic field in the Y direction. The magneto-resistive sensor in the Z direction (upward direction) detects the vector value of the external magnetic field in the Z direction. The analog output signal generated by magneto-resistive sensor is further amplified and transmitted to the micro-processor for subsequent processing. Since the electronic compass of the magneto-resistive sensor advantageously has smaller volume and faster response rate, the magneto-resistive sensor significantly outdoes the Hall sensor in terms of sensitivity and linearity.

The logic operation processing unit 130 calculates the related-coordinate information and the distance information of at least four tri-axes magnetic sensors 120 relative to the magnetic landmark 110 according to at least four magnetic signals to generate an identification data.

In FIG. 1, p represents a landmark magnetic moment; the coordinate system of the magnetic landmark is expressed as [Ox Oy Oz]; the four tri-axes magnetic sensors 120 in the three-dimension coordinate system is expressed as [bx by bz]; the four tri-axes magnetic sensors 120 are four non-coplanar points. The No. 0 sensor is positioned at the origin. The No. 1, No, 2 and No. 3 sensors are respectively disposed on the X-axis, the Y-axis and the Z-axis of the sensor coordinate system. The distance between each of the No. 1, No, 2 and No. 3 sensors and the origin is a known distance (such as length d). The position of each of the No. 0, No, 2 and No. 3 sensors relative to the landmark coordinate system is expressed as $r_i \cdot n_i$, wherein i is a numbering parameter between 0~3; r is the distance of the four tri-axes magnetic sensors 120 relative to the magnetic landmark 110; n is a directional vector.

In the following formulas, B represents a vector of magnetic moment detected by each tri-axes magnetic sensor 120 at distance r; B' represents a vector of magnetic moment detected by each tri-axes magnetic sensor 120 at distance r+ndr, $\mu_0$ represents a spatial medium parameter. The difference of the magnetic moments B and B' can be obtained from formulas (1) and (2) and expressed as formula (3).

$$B = \frac{\mu_0}{4\pi} \frac{3(p \cdot n)n - p}{r^3} = [B_x \; B_y \; B_z]^T \tag{1}$$

$$B' = \frac{\mu_0}{4\pi} \frac{3(p \cdot n)n - p}{(r+dr)^3} = [B'_x \; B'_y \; B'_z]^T \tag{2}$$

$$B - B' = \frac{\mu_0}{4\pi}(3(p \cdot n)n - p)\frac{\partial}{\partial r}\frac{1}{r^3}dr \cong -\frac{3}{r}Bdr \tag{3}$$

The vector of magnetic flux difference can be expressed using the gradient tensor matrix G, and formula (4) can be obtained from formula (3).

$$G = \begin{bmatrix} \partial_x B_x & \partial_y B_x & \partial_z B_x \\ \partial_x B_y & \partial_y B_y & \partial_z B_y \\ \partial_x B_z & \partial_y B_z & \partial_z B_z \end{bmatrix}, r = -3G^{-1}B \tag{4}$$

It can be known from the above formulas that the coordinate and distance information of each tri-axes magnetic sensor 120 can be obtained from the magnetic moment B detected and the gradient tensor matrix G by each tri-axes magnetic sensor 120 in the space. Details of solving the simultaneous equations using the gradient tensor matrix G are disclosed below. Suppose the magnetic field signal received by each tri-axes magnetic sensor 120 can be expressed as:

$$\hat{z}_{i,m}(k) = B_E(k) + R_{landmark}^{body}(k)B_i(k) + O + N_{i,m}(k) \tag{5}$$

Wherein $B_E$ represents a geomagnetic vector; $R_{landmark}^{body}$ represents a rotation matrix between the landmark coordinate and the sensor coordinate; O represents the hard iron effect in the environment; N represents a noise vector. If the magnetic sensor system contains gyro information, then the gyro information can be added to the system to obtain better estimation results.

The gyro sensing signal can be expressed as:

$$\hat{z}_{i,gyro}(k) = [\omega_{i,x}(k) \; \omega_{i,y}(k) \; \omega_{i,z}(k)]^T + N_{i,gyro}(k) \tag{6}$$

Wherein, $\omega$ represents an angular speed of the sensor coordinate; N represents a noise vector.

Based on formulas (1), (4) and (5), the gradient tensor matrix G can be obtained using approximation method:

$$[\partial_x B_x \; \partial_x B_y \; \partial_x B_z]^T(k) \approx \left(\frac{B_1(k) - B_0(k)}{d}\right) = \tag{7}$$

$$R_{body}^{landmark}(k)\left(\frac{\hat{z}_{1,m}(k) - \hat{z}_{0,m}(k)}{d}\right) + N_{0,1}(k)$$

$$[\partial_y B_x \; \partial_y B_y \; \partial_y B_z]^T(k) \approx \left(\frac{B_2(k) - B_0(k)}{d}\right) = \tag{8}$$

$$R_{body}^{landmark}(k)\left(\frac{\hat{z}_{2,m}(k) - \hat{z}_{0,m}(k)}{d}\right) + N_{0,2}(k)$$

$$[\partial_z B_x \; \partial_z B_y \; \partial_z B_z]^T(k) \approx \left(\frac{B_3(k) - B_0(k)}{d}\right) = \tag{9}$$

$$R_{body}^{landmark}(k)\left(\frac{\hat{z}_{3,m}(k) - \hat{z}_{0,m}(k)}{d}\right) + N_{0,3}(k)$$

Wherein $R_{body}^{landmark}$ can be expressed as:

$$R_{body}^{landmark} = [n_1 - n_0 \; n_2 - n_0 \; n_3 - n_0] \tag{10}$$

$\dot{R}_{body}^{landmark}$ can be obtained by differentiating $R_{body}^{landmark}$:

$$\dot{R}_{body}^{landmark} \approx \Omega R_{body}^{landmark} = \begin{bmatrix} 0 & -\omega_z & \omega_y \\ \omega_z & 0 & -\omega_x \\ -\omega_y & \omega_x & 0 \end{bmatrix} \cdot R_{body}^{landmark} \tag{11}$$

Formula (12) can be obtained through the rearrangement of formulas (7)-(9), wherein $u_i = n_i - n_0$, i=1~3.

$$B_0(k) = \frac{-1}{3}G(k)r_0(k) = \frac{-1}{3d}\begin{bmatrix}u_1(k)^T\\u_2(k)^T\\u_3(k)^T\end{bmatrix}\cdot\begin{bmatrix}(\hat{z}_{1,m}(k)-\hat{z}_{0,m}(k))^T\\(\hat{z}_{2,m}(k)-\hat{z}_{0,m}(k))^T\\(\hat{z}_{3,m}(k)-\hat{z}_{0,m}(k))^T\end{bmatrix}^T\cdot r_0(k) \quad (12)$$

If $x=[u_1\ u_2\ u_3\ r_0], \in R^{12}$, then the linear system matrix A can be expressed as formula (13), wherein w represents a vector of system noises.

$$x(k+1)=A(k)x(k)+w(k),\ A=\begin{bmatrix}I_3+\Omega\Delta t & 0 & 0 & 0\\0 & I_3+\Omega\Delta t & 0 & 0\\0 & 0 & I_3+\Omega\Delta t & 0\\0 & 0 & 0 & I_3\end{bmatrix} \quad (13)$$

Based on the features of rotation matrix, the following constraints can be obtained:

$u_1^T u_2=0$ $u_2^T u_3=0$ $u_3^T u_1=0$ $u_1^T u_1=1$ $u_2^T u_2=1$ $u_3^T u_3=1$ (14)

Figure 4:
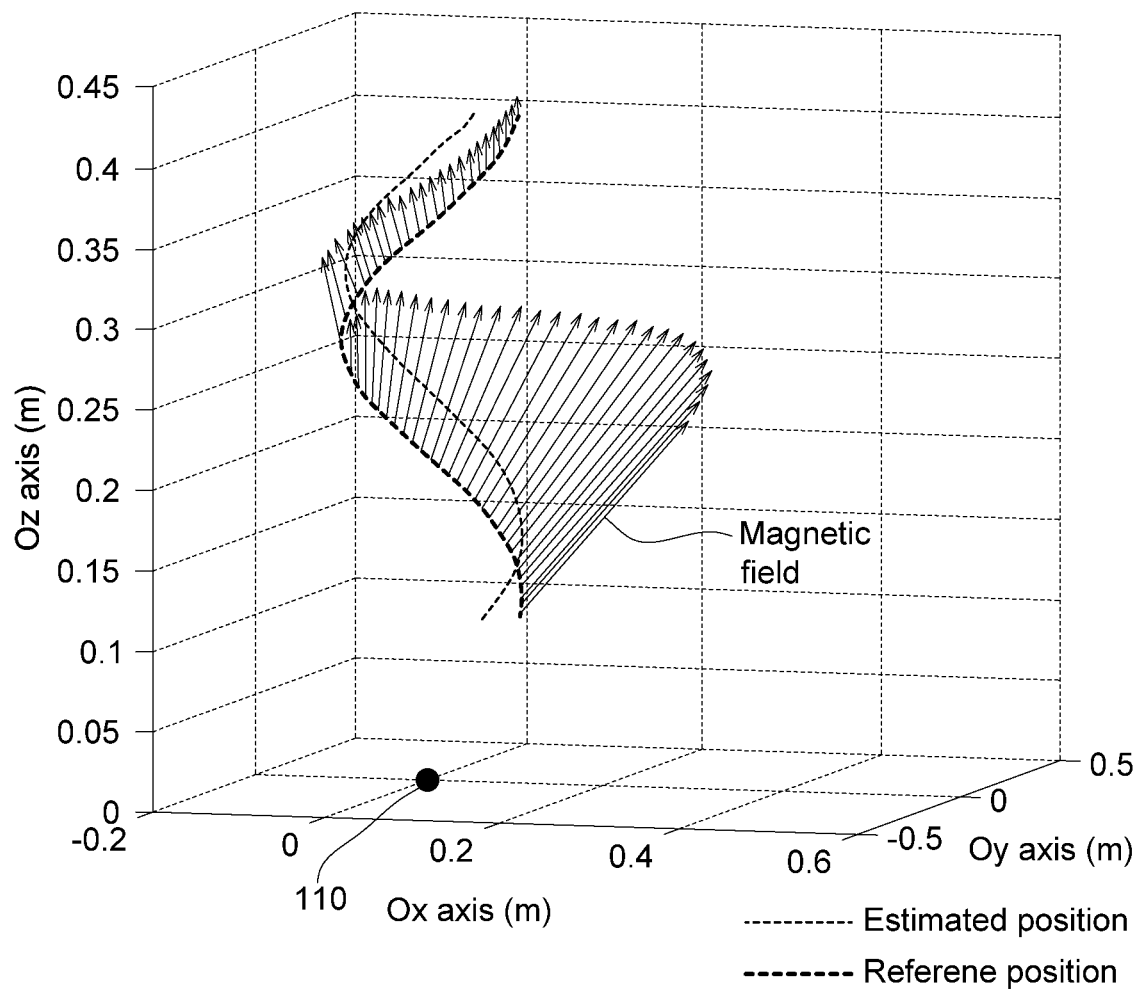
FIG. 4 is a distribution diagram of a specific locus of magnetic field in a three-dimension coordinate system.
Figure 5:
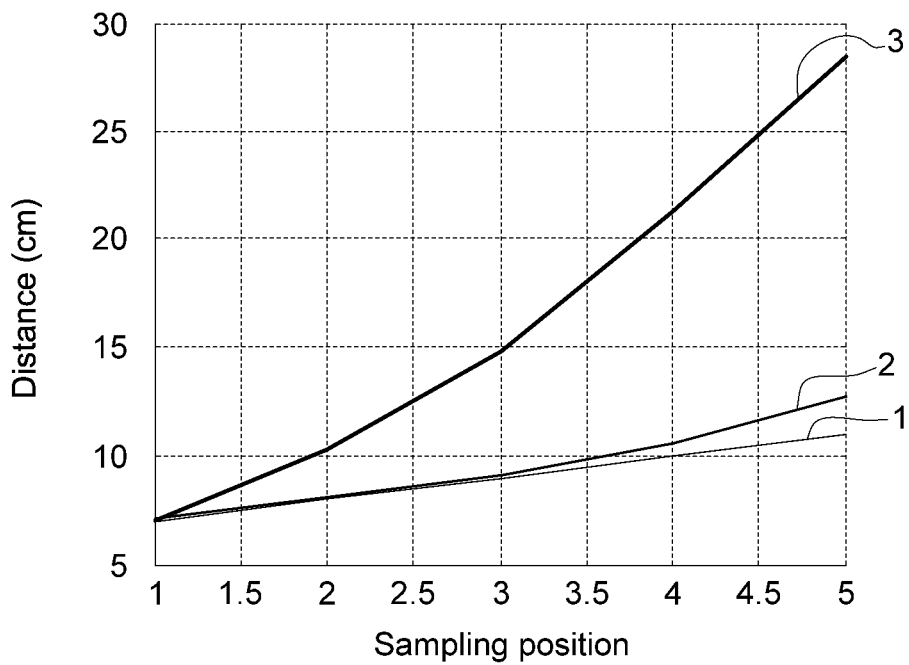
FIG. 5 is a comparison diagram of the results obtained using the positioning method of the disclosure and the conventional energy estimation method.

Lastly, following formula is obtained using constrained Kalman filter. Refer to FIG. 4 and FIG. 5. FIG. 4 is a distribution diagram of a specific locus of magnetic field in a three-dimension coordinate system. FIG. 5 is a comparison diagram of the results obtained using the positioning method of the disclosure and the conventional energy estimation method. The accuracy and efficiency of the algorithm are verified according to the simulation results of FIGS. 4 and 5. The procedures of the algorithm are as follows:

$x(k+1)=A(k)x(k)+w(k)$ $y(k)=h(x(k))+v(k)$ st. $G_{hard}(x(k))=h$ (15)

Measurement update:

$H(k)=\nabla^T h(\hat{x}^-(k))$ $P^+(k)=(P^-(k)^{-1}+H(k)^T R^{-1} H(k))^{-1}$ $F(k)=\nabla^T G_{Hard}(\hat{x}^-(k))$ $f(k)=h-G_{Hard}(\hat{x}^-(k))+F(k)\hat{x}^-(k)$ $\hat{x}^U(k)=\hat{x}^-(k)+P^+(k)H(k)^T R^{-1}(y(k)-h(\hat{x}^-(k)))$ $\hat{x}^+(k)=\hat{x}^U(k)-P^+(k)F(k)^T\cdot[F(k)P^+(k)F(k)^T]^{-1}[F(k)\hat{x}^U(k)-f(k)]$ Time update:

$\hat{x}^-(k+1)=A(k)\hat{x}^+(k)$ $P^-(k)=A(k)P^+(k)A(k)^T+Q$

Wherein, x and y represent a state vector and a measurement vector respectively; k represents a time parameter; A represents a linear system matrix; P represents magnetic moment; r represent a distance from each sensor to the origin; P- and P+ represent state error covariance matrix; h represents a measurement equation; H represents a Jacobian matrix of h; Q and R represent noise covariance matrixes; w and v respectively represent a vector of zero mean white Gaussian noises.

FIG. 4 shows a simulation result. A magnetic landmark is positioned at the origin of a virtual coordinate system, and a spiral upward path is composed in the space. The direction and length of an arrow represent the direction and intensity of the magnetic field detected at each point on the path. The thick dashed line represents actual reference positions. The thin dashed line represents estimated positions obtained using the algorithm of the present application. As indicated in FIG. 4, the errors of estimation maintain within a minimum value without diverging, therefore the convergence property of the algorithm of the present application can be verified.

FIG. 5 is a comparison diagram of the results obtained using the positioning method of the present application and the conventional energy estimation method. FIG. 5 shows that the positioning method of the present application is superior to the conventional energy estimation method. Curve 1 denotes reference positions; curve 2 denotes estimated positions obtained using the algorithm of the present application; curve 3 denotes the positions calculated according to a relationship formula that energy is inversely proportional to the square of the distance. The three curves are equalized to the same starting points. Along with the increase in distance and signal-to-noise ratio, error starts to increase. The comparison clearly shows that the positioning method of the present application is superior to the conventional energy estimation method.

The above disclosure shows that when the moving object 100 passes through the magnetic landmark 110, the logic operation processing unit 130 calculates the position vector r of the at least four tri-axes magnetic sensors 120 relative to the magnetic landmark 110 according to the magnetic moment B and the gradient tensor matrix G of the at least four tri-axes magnetic sensors 120 relative to the magnetic landmark to obtain an identification data, wherein $r=-3G^{-1}B$ and the identification data is the positioning data of the moving object 100.

A localization device using magnetic field and a positioning method thereof are disclosed in above embodiments of the disclosure. The localization device is capable of detecting the coordinates of a moving object in the space and requires only one magnetic landmark. Therefore, the disclosure does not require prior arrangement of the environment or multiple magnetic landmarks. Besides, the known technologies which estimate the distance using magnetic intensity are nonlinear (inversely proportional to the square of the distance) and have low resistance against noises. The localization device using magnetic field and the positioning method of the present disclosure employ at least four non-coplanar tri-axes magnetic sensors, such that the estimation system becomes a linear system and achieves millimeter (mm) level precision, and the information of the three-dimension coordinate system can be calculated.

While the disclosure has been described by way of example and in terms of the embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A localization device using a magnetic field for positioning a moving object, consisting of:
   a magnetic landmark;
   a set of only four tri-axes magnetic sensors mounted on the moving object, wherein the set of only four tri-axes magnetic sensors forms four non-coplanar points in a three-dimension coordinate system; and
   a logic operation processing unit connected to the set of only four tri-axes magnetic sensors, wherein the set of only four tri-axes magnetic sensors senses the magnetic field of the magnetic landmark and generates four magnetic signals transmitted to the logic operation processing unit.

2. The localization device as claimed in 1, wherein the set of only four tri-axes magnetic sensors is positioned on three axes and an origin of the three-dimension coordinate system and the distance between any two of the four tri-axes magnetic sensors is a known distance.

3. The localization device as claimed in 2, wherein when the moving object passes through the magnetic landmark, the logic operation processing unit calculates a related-coordinate information and a distance information of the set of only four tri-axes magnetic sensors relative to the magnetic landmark according to the four magnetic signals transmitted from the set of at least four tri-axes magnetic sensors to generate an identification data.

4. The localization device as claimed in 3, wherein the logic operation processing unit calculates a position vector r of the set of only four tri-axes magnetic sensors relative to the magnetic landmark according to a magnetic moment B and a gradient tensor matrix G of the set of only four tri-axes magnetic sensors relative to the magnetic landmark to obtain the identification data, wherein $r=-3G^{-1}B$.

5. A positioning method using a magnetic field for positioning a moving object relative to a magnetic landmark, wherein the moving object consists of a frame and a set of only four tri-axes magnetic sensors mounted on the frame, the set of only four tri-axes magnetic sensors forms four non-coplanar points in a three-dimension coordinate system, and the positioning method comprises:
   sensing the magnetic field of the magnetic landmark and generating four magnetic signals by the set of only four tri-axes magnetic sensors;
   receiving a first magnetic moment detected by each of the tri-axes magnetic sensors at a first distance relative to the magnetic landmark;
   receiving a second magnetic moment detected by each of the tri-axes magnetic sensors at a second distance different from the first distance relative to the magnetic landmark;
   calculating a difference vector between the first magnetic moment and the second magnetic moment; and
   calculating a coordinate information and a distance information of each of the tri-axes magnetic sensors relative to the magnetic landmark according to the difference vector.

6. The positioning method as claimed in 5, wherein the set of only four tri-axes magnetic sensors is positioned on three axes and an origin of the three-dimension coordinate system and the distance between any two of the four tri-axes magnetic sensors is a known distance.

7. The positioning method as claimed in 6, wherein when the moving object passes through the magnetic landmark, the positioning method comprises calculating the related-coordinate information and the distance information of the set of only four tri-axes magnetic sensors relative to the magnetic landmark to generate an identification data.

8. The positioning method as claimed in 7, wherein a position vector r of the set of only four tri-axes magnetic sensors relative to the magnetic landmark is calculated according to a magnetic moment B and a gradient tensor matrix G of the set of only four tri-axes magnetic sensors relative to the magnetic landmark to obtain the identification data, wherein $r=-3G^{-1}B$.

9. A localization device using a magnetic field for positioning a moving object, consisting of:
   a magnetic landmark;
   a set of only four tri-axes magnetic sensors mounted on the moving object, wherein the set of only four tri-axes magnetic sensors forms four non-coplanar points in a three-dimension coordinate system; and
   a logic operation processing unit connected to the set of only four tri-axes magnetic sensors, wherein the set of only four tri-axes magnetic sensors senses the magnetic field of the magnetic landmark and generates four magnetic signals transmitted to the logic operation processing unit,
   wherein the logic operation processing unit receives a first magnetic moment detected by each of the tri-axes magnetic sensors at a first distance relative to the magnetic landmark, and receives a second magnetic moment detected by each of the tri-axes magnetic sensors at a second distance different from the first distance relative to the magnetic landmark, and calculates a difference vector between the first magnetic moment and the second magnetic moment to obtain a gradient tensor matrix of three magnetic components on three axes of each of the tri-axes magnetic sensors and calculates a coordinate information and a distance information of each of the tri-axes magnetic sensors relative to the magnetic landmark according to the difference vector.

* * * * *